US011753059B2

(12) United States Patent
Cattaneo et al.

(10) Patent No.: US 11,753,059 B2
(45) Date of Patent: Sep. 12, 2023

(54) ASSISTED THRUST SYSTEM FOR CARRIAGES OR FOR LOADS IN GENERAL MOVED ON WHEELS

(71) Applicant: Rational Production S.r.l., Albano Sant'Alessandro (IT)

(72) Inventors: Diego Cattaneo, Ranica (IT); Giuliano Bonfanti, Nembro (IT)

(73) Assignee: Rational Production S.r.l., Albano Sant'Alessan (IT)

( * ) Notice: Subject to any disclaimer, the term of this patent is extended or adjusted under 35 U.S.C. 154(b) by 41 days.

(21) Appl. No.: 17/753,507

(22) PCT Filed: Sep. 11, 2020

(86) PCT No.: PCT/IB2020/058442
§ 371 (c)(1),
(2) Date: Mar. 4, 2022

(87) PCT Pub. No.: WO2021/064496
PCT Pub. Date: Apr. 8, 2021

(65) Prior Publication Data
US 2022/0332358 A1 Oct. 20, 2022

(30) Foreign Application Priority Data
Oct. 3, 2019 (IT) .................. 102019000017933

(51) Int. Cl.
*B62B 5/00* (2006.01)
*B60K 7/00* (2006.01)
(Continued)

(52) U.S. Cl.
CPC ............ *B62B 5/004* (2013.01); *B62B 5/0053* (2013.01); *B62B 5/0066* (2013.01);
(Continued)

(58) Field of Classification Search
CPC ... B62B 5/0026; B62B 5/0033; B62B 5/0036; B62B 5/0043; B62B 5/0046; B62B 5/004; B62B 5/005; B62B 5/04; B62B 5/0414
See application file for complete search history.

(56) References Cited

U.S. PATENT DOCUMENTS 3,613,813 A * 10/1971 Biddle .................. A61G 5/042
280/42
5,045,742 A * 9/1991 Armstrong ............. H02K 1/146
310/216.013
(Continued)

FOREIGN PATENT DOCUMENTS

CN 205737609 U 11/2016
CN 106428301 A 2/2017
(Continued)

OTHER PUBLICATIONS

International Search Report and Written Opinion of the International Searching Authority; Application No. PCT/B2020/058442; Completed: Oct. 30, 2020; dated Nov. 10, 2020; 10 pages.

*Primary Examiner* — Emma K Frick
(74) *Attorney, Agent, or Firm* — WHITMYER IP GROUP LLC (57) ABSTRACT

An assisted thrust system for a carriage provided with wheels that includes a base to which a first directional wheel and a second directional wheel are fixed that are connected to the base so as to be able to rotate around a respective axis perpendicular to the base; to the base a first drive wheel and a second drive wheel are further fixed that are rotated by at least one gearmotor unit, which drives the first drive wheel by a first magnetic coupling device and the second drive wheel by a second magnetic coupling device.

16 Claims, 9 Drawing Sheets

(51) Int. Cl.
  *B60K 17/04* (2006.01)
  *B62B 5/04* (2006.01)
  *B60K 17/02* (2006.01)

(52) U.S. Cl.
  CPC ............ *B62B 5/0069* (2013.01); *B60K 17/02* (2013.01); *B60K 17/043* (2013.01); *B60K 2007/0038* (2013.01); *B60K 2007/0069* (2013.01); *B60Y 2400/423* (2013.01); *B62B 5/0414* (2013.01)

(56) References Cited

U.S. PATENT DOCUMENTS

| | | | |
|---|---|---|---|
| 6,276,219 | B1 | 8/2001 | Kube et al. |
| 7,621,360 | B2 * | 11/2009 | Stubner ................ B60K 7/0007 180/65.6 |
| 8,983,740 | B2 * | 3/2015 | Eidelson ............. B62D 51/001 180/65.6 |
| 9,358,169 | B2 * | 6/2016 | Ottenweller ............. A61G 7/08 |
| 9,969,212 | B2 * | 5/2018 | Lin ......................... B60B 3/001 |
| 10,246,117 | B1 * | 4/2019 | Chien ...................... A61H 3/04 |
| 10,377,403 | B2 * | 8/2019 | Lee ..................... B60K 17/043 |
| 11,098,793 | B1 * | 8/2021 | Knapke ................. B60K 17/16 |
| 11,577,598 | B2 * | 2/2023 | Kawamura ............. B60K 7/00 |
| 2019/0092365 | A1 | 3/2019 | Lee et al. |

FOREIGN PATENT DOCUMENTS

| | | |
|---|---|---|
| CN | 109080444 A | 12/2018 |
| EP | 1818185 A1 | 8/2007 |
| JP | S63215459 A | 9/1988 |
| WO | 2019075002 A1 | 4/2020 |

* cited by examiner

ASSISTED THRUST SYSTEM FOR CARRIAGES OR FOR LOADS IN GENERAL MOVED ON WHEELS

TECHNICAL FIELD

The invention relates to an assisted thrust system for moving loads, for example for moving food carriages or carriages in general with a loading surface on which loads to be moved can be arranged.

BACKGROUND

From CN 106428301, an assisted traction device for mine carriages is known that comprises a motor fitted to the rotation axis of at least one wheel of a mine carriage. The rotation axle of the wheel is connected directly to the shaft of the motor. Preferably, the respective motors are applied to a pair of opposite wheels of the carriage. The motor, or the motors, have sufficient power to move the carriage, such that by starting up the motor, or the motors, the carriage can be used, without the need for the intervention of a thrust by a carriage operator. As the motors are applied directly to the axle of the wheels, the motor torque required to move the carriages and accordingly the power of the motors is high, making the traction device expensive.

JP S63215459 discloses a carriage for conveying loads that comprises a base on which the load to be conveyed is rested, a grip that an operator grasps to apply a force to the carriage, and a force sensor arranged between the base and the grip. The carriage further comprises a pair of directional wheels and a pair of drive wheels. The directional wheels are driven by a first motor fixed to the base of the carriage and connected to a steering system by means of which it is possible to modify the movement direction of the directional wheels; the drive wheels are driven by a second motor fitted to the axle of the drive wheels. The first and the second motor are controlled by a control unit that, on the basis of the intensity and the direction of the force applied to the carriage by the operator, controls driving the first and second motor to steer the directional wheels, if necessary, and to advance, or retract the carriage by cancelling the force exerted by the operator on the grip. The drive system of the carriage is very complex and expensive.

CN 205737609 U discloses a light electric carriage for activities of moving a load comprising a frame, a motor, a controller, and a battery. The motor and the battery are respectively coupled with the controller. The motor comprises a left motor and a right motor each fitted to the axle of one of the rear wheels of the carriage.

The control device comprises a start/stop switch, a switch for selecting the control mode, a backwards-forwards selection switch.

The user selects the operating mode of the carriage through the start/stop switch, the switch for selecting the control mode and the backwards/forwards selection switch. After detecting the control signal, a microcontroller sends a control signal to the electronic unit that controls the driving of the motors to enable the carriage to be started up.

The start/stop switch is used to transmit an activation/deactivation signal, the switch for selecting the control mode is for transmitting a push/command control mode signal, and the backwards/forwards selection switch is used to transmit an advance and backward movement signal. The user is assisted in all the carriage movement steps after activating the aforesaid switches, but the controls of the motor comprising three switches make handling the carriage complicated.

U.S. Pat. No. 6,276,219 discloses a conveying carriage comprising a load positioning portion and a portion where the components of the carriage drive are positioned. A drive wheel is driven by a motor that can be for example an electric motor powered by a rechargeable battery. The carriage is further provided with a steering pole that can be rotated around an axle. At the free end of the steering pole a grip is provided with operating buttons to raise and lower the steering pole.

The steering pole is further provided with sensor means that measures the force with which an operator pulls or pushes the carriage. The sensor means transmits an output signal that is transmitted to a feedback control unit. The feedback control unit contains software associated with the drive components. The feedback control unit processes and transforms the signal received from the sensor means into a drive signal that is sent to the motor so that a force (torque) is applied to the wheels connected to the motor. The feedback control unit is able to compensate the force of the operator by driving the motor so that the force applied to the steering pole and measured by the sensor means is substantially nil or very small.

In an emergency situation, for example in the event of a reversal of the movement direction, it is possible to activate a brake that stops the carriage immediately.

Also, in this case the drive system of the carriage is complex and costly.

The carriages disclosed in the documents mentioned above moreover have the drawback that once the motor, or the motors, connected to the wheels of the carriage are started, if the operator for any reason loses a grip on the carriage, the carriage can move autonomously, thus constituting a hazard for the people who are near the carriage.

SUMMARY

One object of the present invention is to provide an assisted thrust system for loads moved on wheels that is simple and cheap to make.

Another object of the present invention is to provide an assisted thrust system that is easy and safe for an operator to use who has to move a load placed on the carriage.

The objects of the present invention are achieved with an assisted thrust system according to the claims.

Owing to the invention, an assisted thrust system is provided that is easy and cheap to make, which assists an operator in moving loads on a carriage, significantly reducing the effort required for the operator to move the carriage.

The system according to the invention is simple to use, because it does not require complex operations from the operator to activate or deactivate the system.

Further, the system is secure because the carriage cannot move autonomously if, for example, the operator loses grip of the carriage because the push that the system exerts on the carriage is not sufficient to move the carriage autonomously, i.e. without a push by the operator, but is used only to reduce the effort required for the operator to move the carriage.

BRIEF DESCRIPTION OF THE DRAWINGS

Further features and advantages of the present invention will result from the following description, with reference to the enclosed drawings in which.

DETAILED DESCRIPTION

Figure 1:
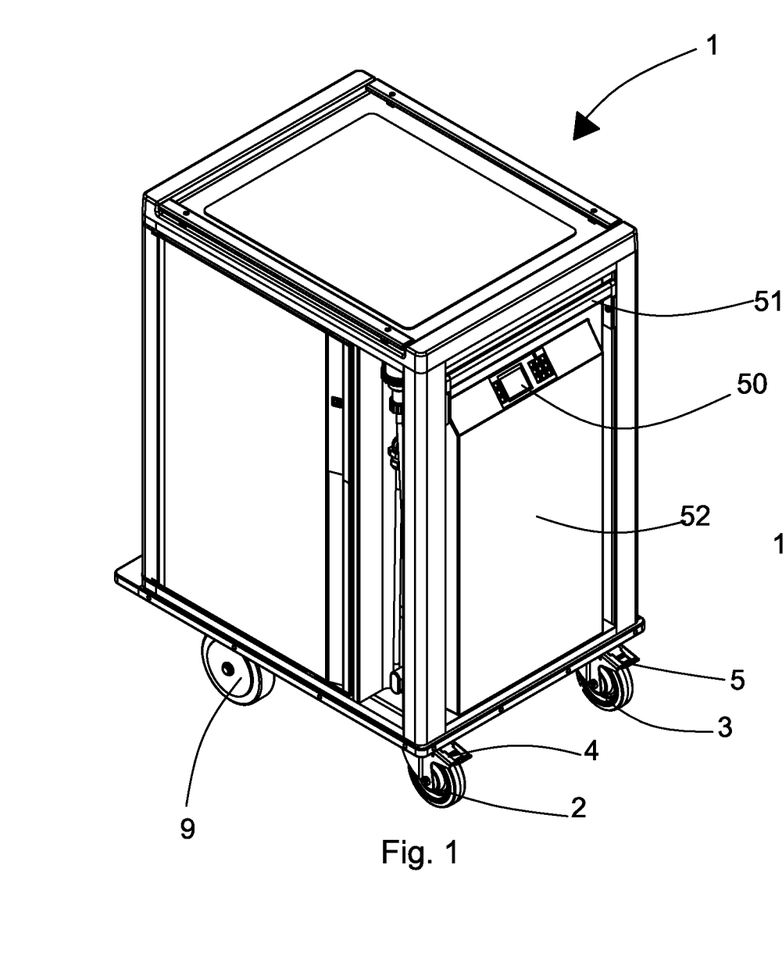
FIG. 1 is a perspective view of a food carriage to which the assisted thrust system according to the present invention is applied.
Figure 2:
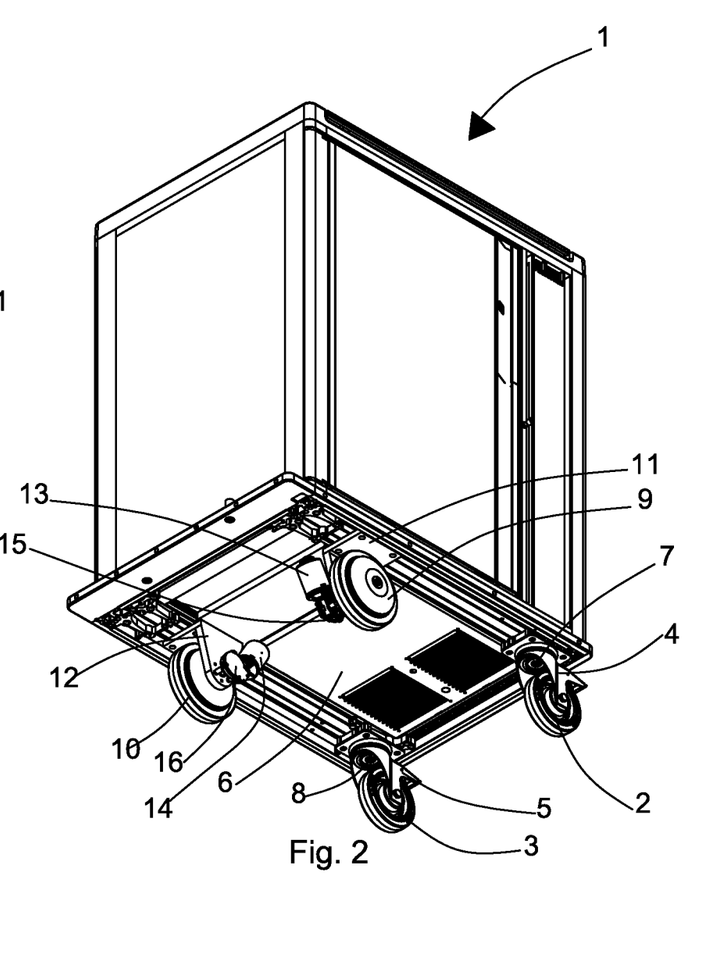
FIG. 2 is a perspective bottom view of the carriage of FIG. 1.
Figure 3:
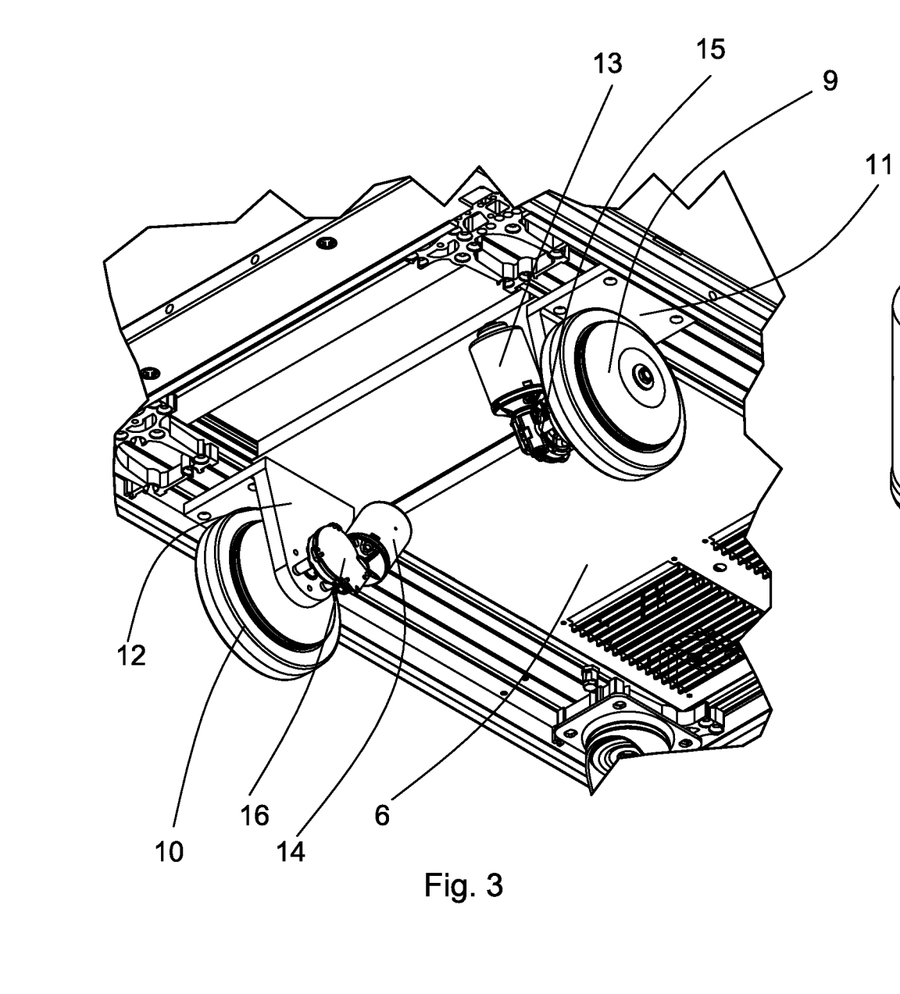
FIG. 3 is an enlarged detail of FIG. 2.
Figure 4:
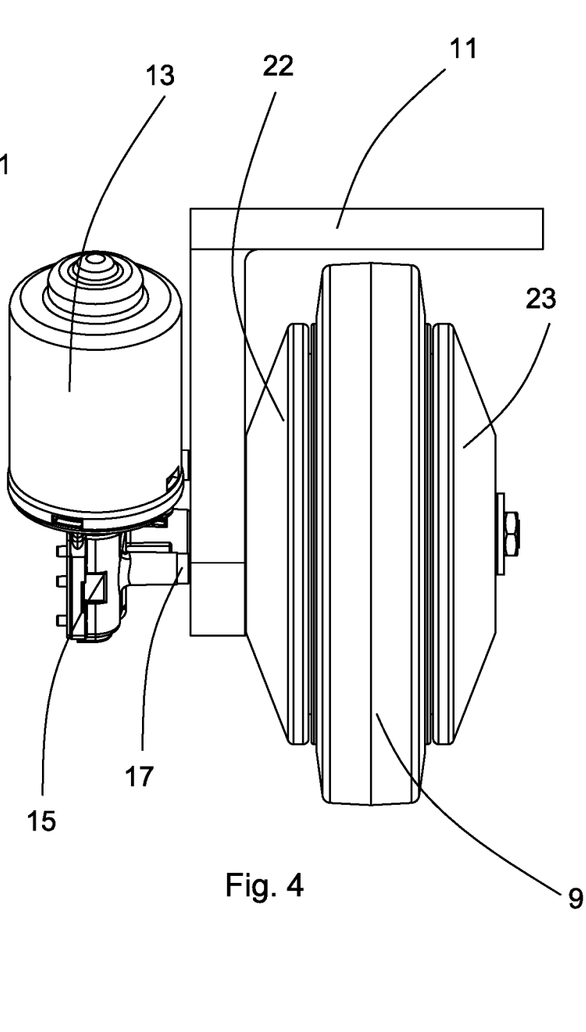
FIG. 4 is an elevation view of a first drive wheel of the carriage of FIG. 1, with the assisted thrust system according to the invention.
Figure 5:
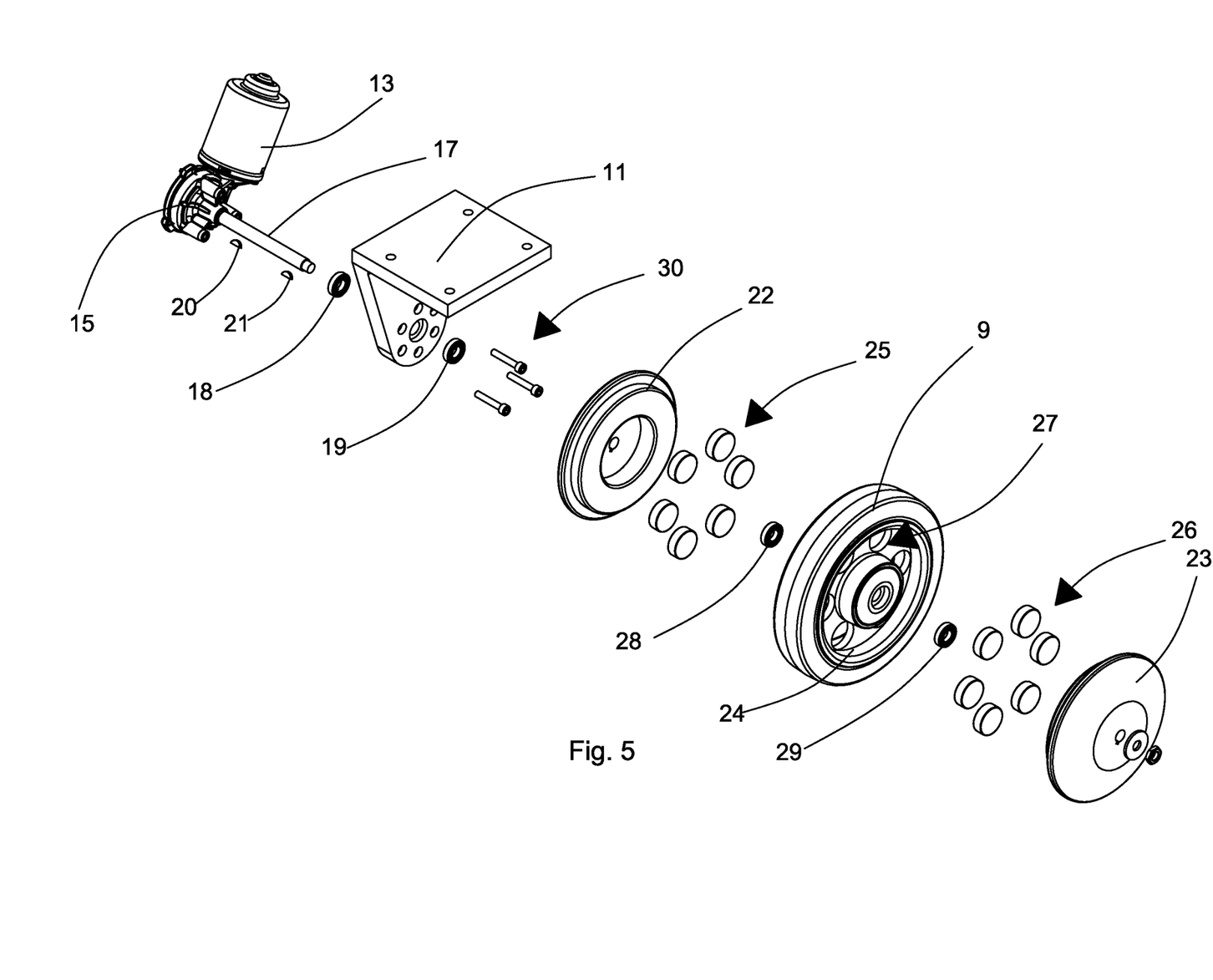
FIG. 5 is an exploded view of the first drive wheel of FIG. 4 with the assisted thrust system according to the invention.
Figure 6:
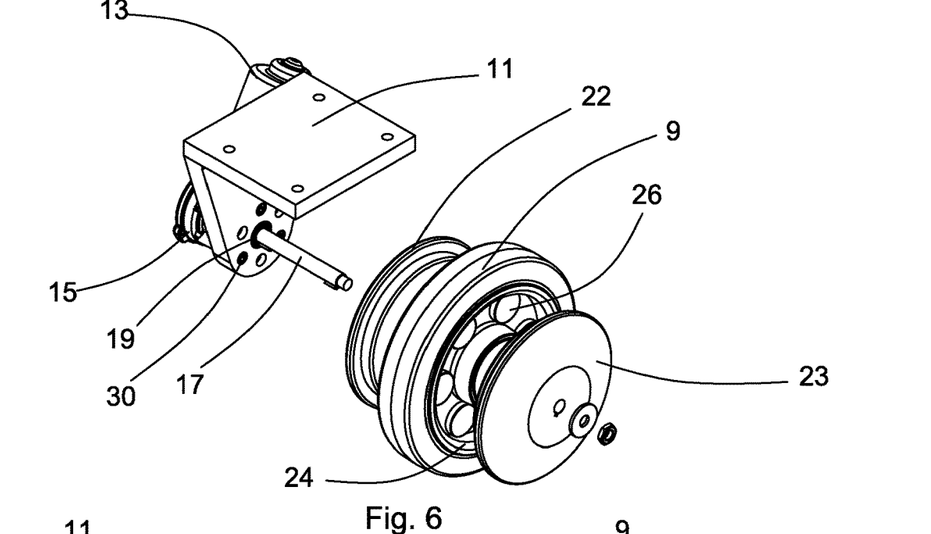
FIG. 6 is a partially exploded perspective view of the first drive wheel of FIG. 4 with the assisted thrust system according to the invention.
Figure 7:
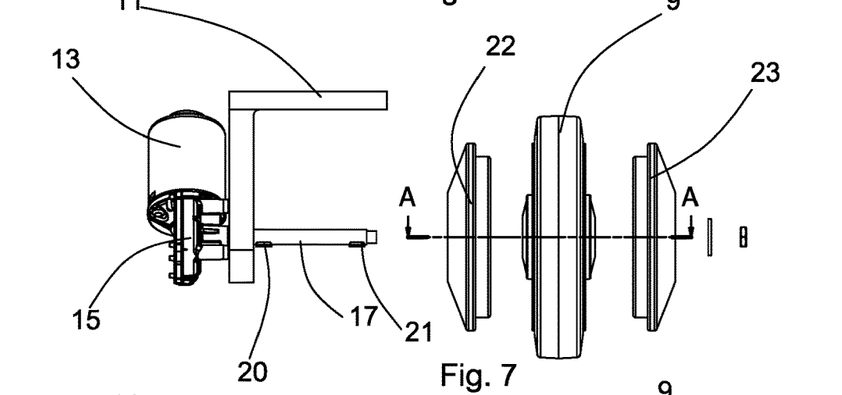
FIG. 7 is a partially exploded elevation view of the first drive wheel of FIG. 4 with the assisted thrust system according to the invention.

In FIGS. 1 to 3, by way of non-limiting example, a food carriage 1 is illustrated that is provided with the assisted thrust system according to the invention.

The carriage 1 comprises a first directional wheel 2 and a second directional wheel 3 that are used to enable the carriage 1 to change direction during motion.

The first directional wheel 2 is fitted to a first support element 4 connected to a base 6 of the carriage 1 so as to be able to rotate around a first rotation axis 7 perpendicular to the base 6.

The second directional wheel 3 is fitted to a second support element 5 connected to a base 6 of the carriage 1 so as to be able to rotate around a second rotation axis 8 perpendicular to the base 6.

The carriage 1 further comprises a first drive wheel 9 fitted to a third support element 11 stiffly fixed to the base 6 of the carriage 1 and a second drive wheel 10 fitted to a fourth support element 12 which is also fixed stiffly to the base 6.

With reference to FIGS. 4 to 8, the assisted thrust system according to the invention applied to the first drive wheel 9 is now disclosed.

The assisted thrust system comprises a first gearmotor unit 13, 15, designed to drive the first drive wheel 9, constituted by a first motor 13 and by a first gear reducer unit 15. The first gearmotor unit 13, 15 is fixed to the third support element 11 by a plurality of screws 30.

The first gearmotor unit 13, 15 transmits the motion to the first drive wheel 9 by a first magnetic coupling device, which is disclosed below.

The first gear reducer unit 15 has a first outlet shaft 17, supported on the third support element 11 by a first pair of bearings 18 and 19.

A first disc 22 made of electrically conductive metal material, for example aluminium and a second disc 23, which is also made of electrically conductive metal material, for example aluminium, are keyed onto the first outlet shaft 17 by respective first keys 20, 21. On the first outlet shaft 17, between the first disc 22 and the second disc 23, the first drive wheel 9 is arranged, fitted free to rotate on the first outlet shaft 17, by a second pair of bearings 28, 29.

The first disc 22 is inserted with clearance into a first seat 45 (FIG. 8) obtained in the first drive wheel 9, so as to be able to rotate with respect to the first drive wheel 9.

Figure 8:
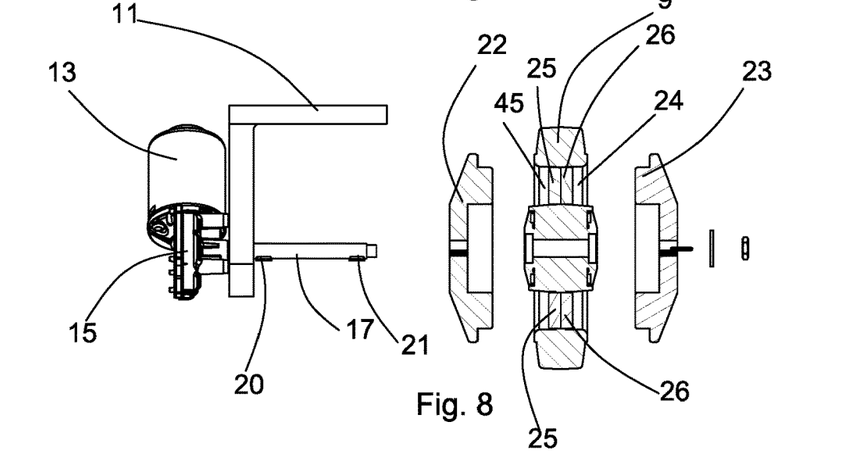
FIG. 8 is a view like that of FIG. 7, partially sectioned along the line A-A of FIG. 7.
Figures 9, 10:
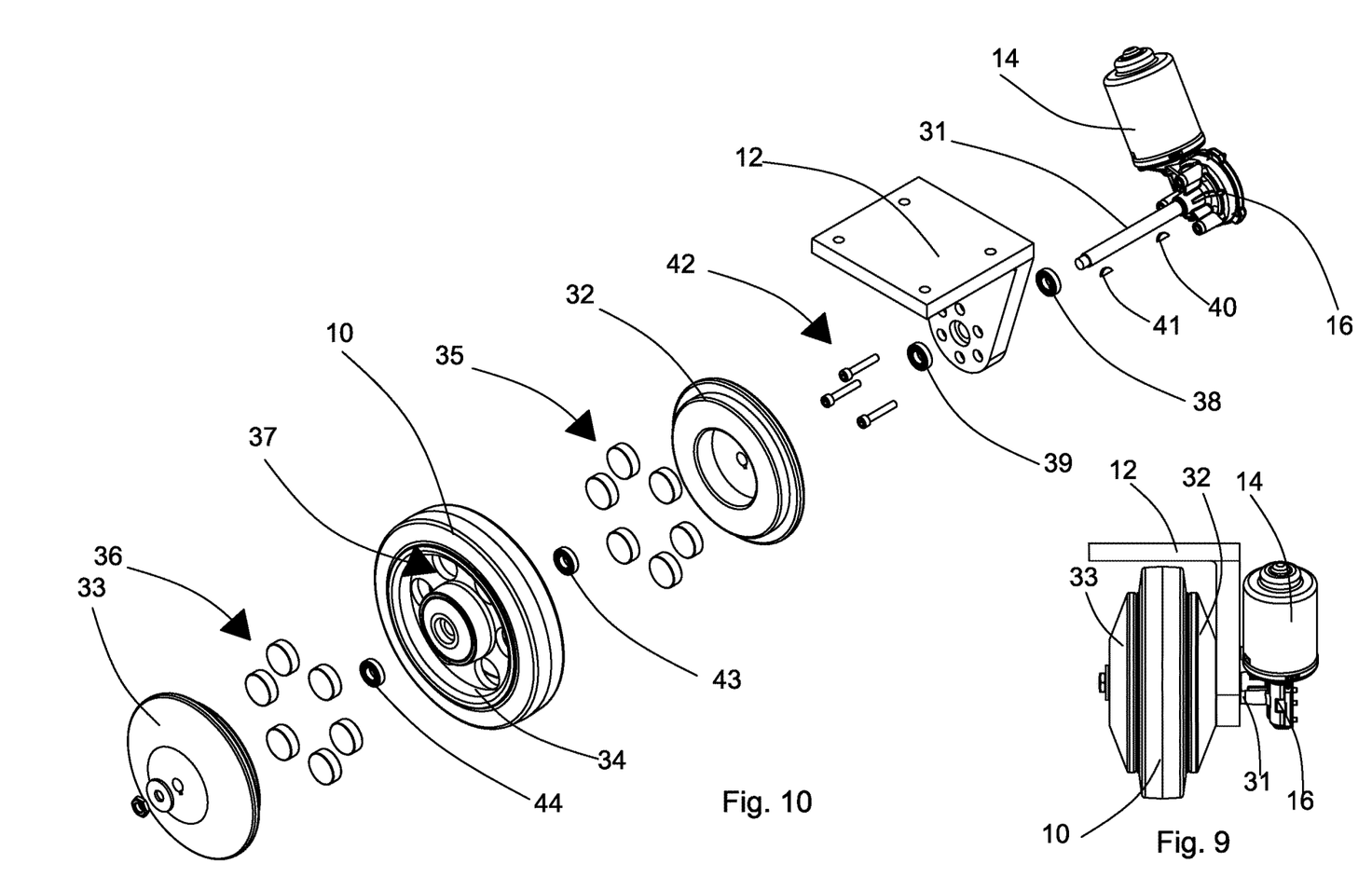
FIG. 9 is an elevation view of a second drive wheel of the carriage of FIG. 1, with the assisted thrust system according to the invention.
FIG. 10 is an exploded view of the second drive wheel of FIG. 9 with the assisted thrust system according to the invention.
Figure 11:
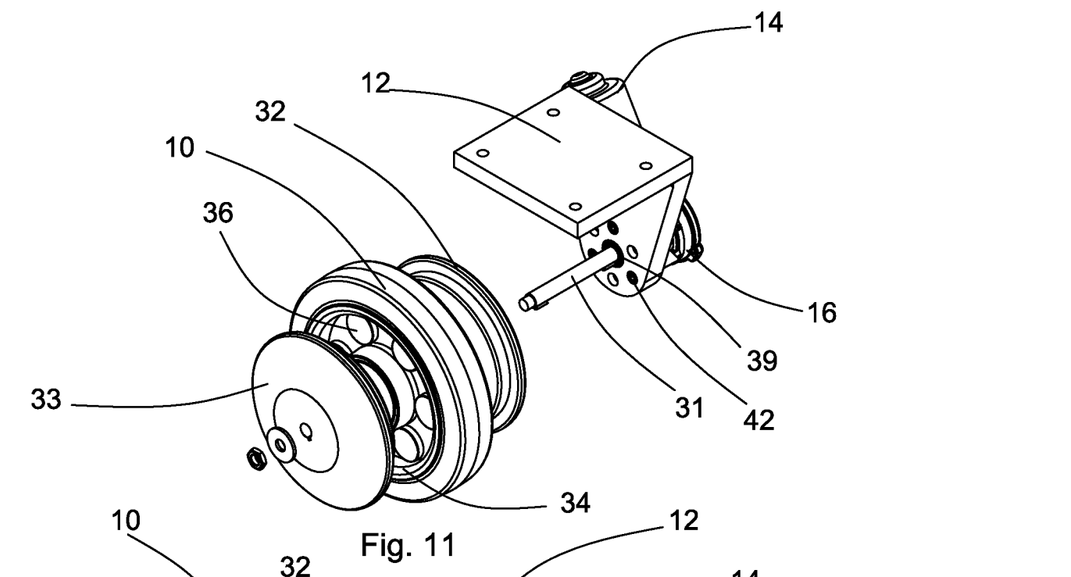
FIG. 11 is a partially exploded perspective view of the second drive wheel of FIG. 9 with the assisted thrust system according to the invention.
Figure 12:
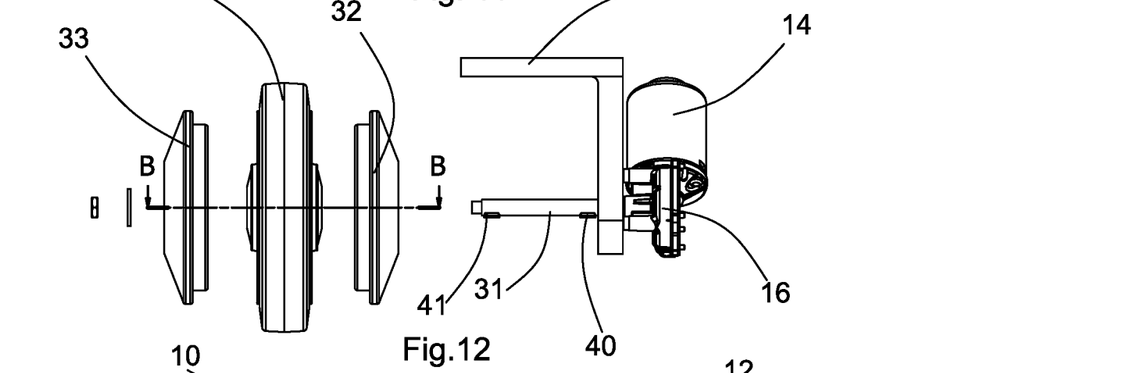
FIG. 12 is a partially exploded elevation view of the second drive wheel of FIG. 9 with the assisted thrust system according to the invention.
Figure 13:
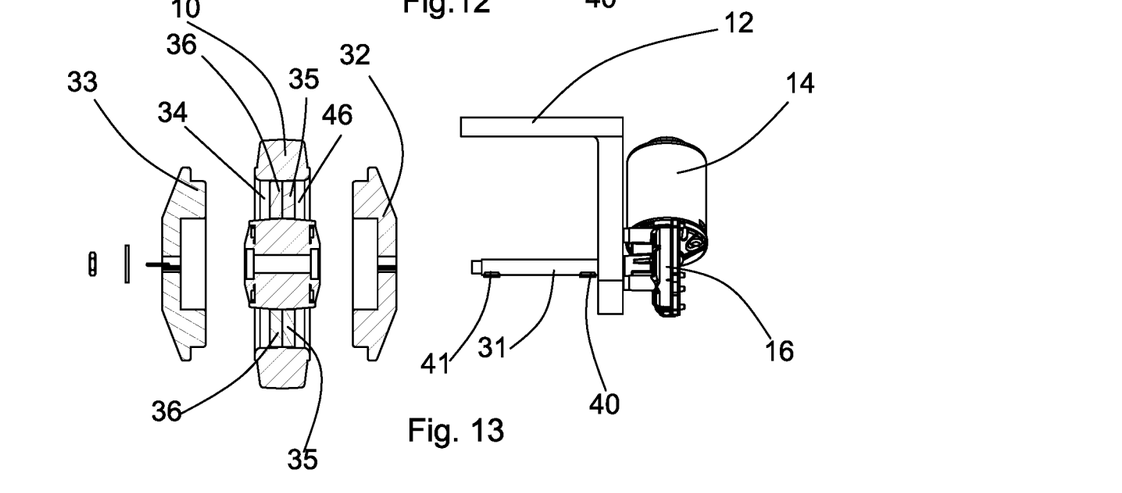
FIG. 13 is a view like that of FIG. 12, partially sectioned along line B-B of FIG. 12.

The second disc 23 is inserted with clearance into a second seat 24 obtained in the first drive wheel 9 in a position opposite the first seat 45, so as to be able to rotate with respect to the first drive wheel 9.

The first drive wheel 9 is provided with a plurality of first housings 27 into which a first group of permanent magnets 25 is inserted, which faces the first disc 22, and a second group of permanent magnets 26 is inserted, which faces the second disc 23.

The first disc 22, the second disc 23, the first group of permanent magnets 25 and the second group of permanent magnets 26 constitute the first magnetic coupling device for transmitting motion from the first gearmotor unit 13, 15 to the first drive wheel 9.

When the first motor 13 is driven, the first motor 13 rotates the outlet shaft 17 of the first gear reducer unit 15, which rotates the first disc 22 and the second disc 23 in the magnetic fields generated by the first group of permanent magnets 25 and by the second group of permanent magnets 26.

The rotation of the first disc 22 and of the second disc 23 inside the aforesaid magnetic fields determines the formation of eddy currents in the first disc 22 and in the second disc 23. The magnetic fields generated by the eddy currents interact with the magnetic fields of the first group of permanent magnets 25 and of the second group of permanent magnets 26, rotating the first drive wheel 9 and generating a thrust on the carriage that reduces the thrust required for an operator to move the carriage.

With reference to FIGS. 9 to 13, the assisted thrust system according to the invention applied to the second drive wheel 10 is disclosed, which is substantially the same as the assisted thrust system applied to the first drive wheel 9.

The assisted thrust system applied to the second drive wheel 10 comprises a second gearmotor unit 14, 16, designed to drive the second drive wheel 10, constituted by a second motor 14 and by a second gear reducer unit 16. The second gearmotor unit 14, 16 is fixed to the fourth support element 12 by a plurality of screws 42.

The second gearmotor unit 14, 16 transmits the motion to the second drive wheel 10 by a second magnetic coupling device substantially the same as that disclosed previously with reference to the first drive wheel 9.

The second gear reducer unit 16 has a second outlet shaft 31, supported on the fourth support element 12 by a third pair of bearings 38 and 39.

A third disc 32 made of electrically conductive metal material, for example aluminium, and a fourth disc 33, which is also made of electrically conductive metal material, for example aluminium, are keyed onto the second outlet shaft 31 by respective second keys 40, 41. On the second outlet shaft 31, between the third disc 32 and the fourth disc 33, the second drive wheel 10 is arranged, fitted free to rotate on the second outlet shaft 31, by a fourth pair of bearings 43, 44.

The third disc 32 is inserted with clearance into a third seat 46 obtained in the second drive wheel 10, so as to be able to rotate with respect to the first drive wheel 10.

The fourth disc 33 is inserted with clearance into a fourth seat 34 obtained in the second drive wheel 10 in a position opposite the third seat 46, so as to be able to rotate with respect to the second drive wheel 10.

The second drive wheel 10 is provided with a plurality of second housings 37 into which a third group of permanent magnets 35 that faces the third disc 32, and a fourth group of permanent magnets 36, that faces the fourth disc 33 are inserted.

The third disc 32, the fourth disc 33, the third group of permanent magnets 35 and the fourth group of permanent magnets 36 constitute the second magnetic coupling device for transmitting motion from the second gearmotor unit 14, 16 to the second drive wheel 10.

When the second motor 14 is driven, the second gear reducer unit 16 rotates the second outlet shaft 31, which rotates the third disc 32 and the fourth disc 33 in the magnetic fields generated by the third group of permanent magnets 35 and by the fourth group of permanent magnets 36.

The rotation of the third disc 32 and of the fourth disc 33 inside the aforesaid magnetic fields determines the formation of eddy currents in the third disc 32 and in the fourth disc 33. The magnetic fields generated by the eddy currents interact with the magnetic fields of the third group of permanent magnets 35 and of the fourth group of permanent magnets 36, rotating the second drive wheel 10 and generating a thrust on the carriage that reduces the thrust required for an operator to move the carriage.

Figure 14:
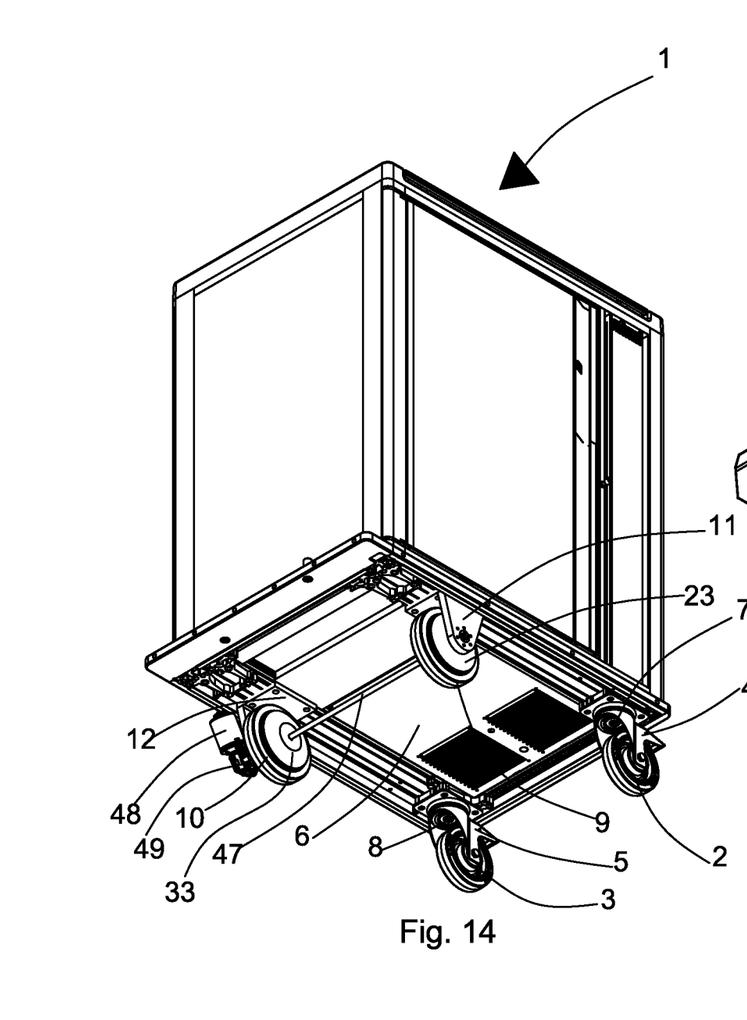
FIGS. 14 and 15 illustrate a version of the assisted thrust system according to the invention, applied to a carriage like that of FIG. 1.
Figure 15:
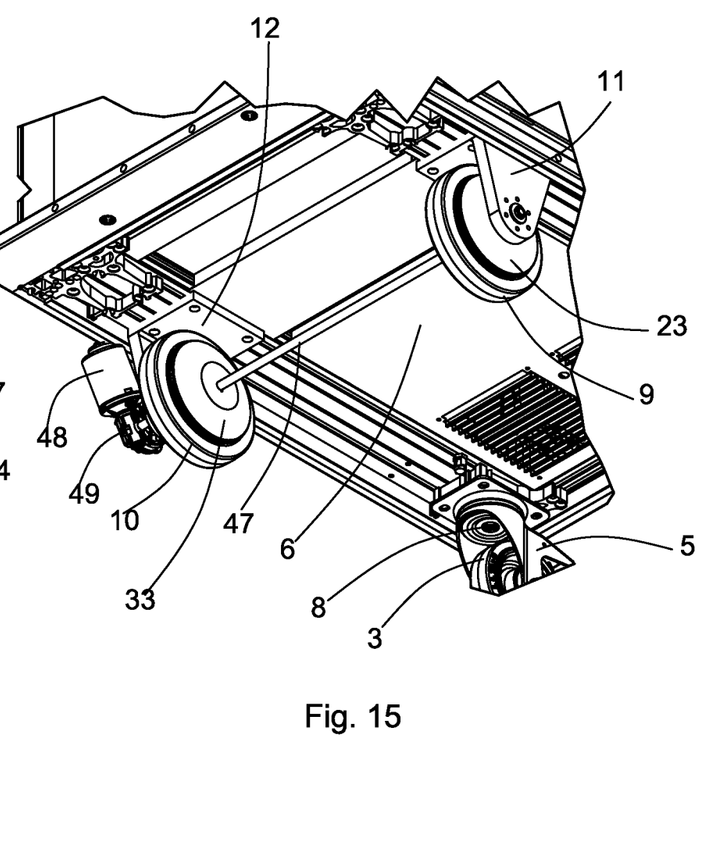

In FIGS. 14 and 15, a variation is illustrated of the assisted thrust system according to the invention applied, merely by way of non-limiting example, to the food carriage 1.

In the carriage 1, in this version, the first drive wheel 9 and the second drive wheel 10 are fitted free to rotate at opposite ends of an axle 47. The axle 47 is supported on a base 6 of the carriage 1 by the first support element 11 and the second support element 12.

The assisted thrust system according to the invention comprises a single gearmotor unit 48, 49, constituted by a third electric motor 48 powered by batteries with which the carriage 1 is provided and by a third gear reducer unit 49 the outlet shaft of which is connected to the axle 47, for example by a joint. Motion is transmitted to the drive wheels 9 and 10 by respective magnetic coupling devices that are the same as the disclosed magnetic coupling devices with reference to the version of the thrust system according to the invention illustrated in FIGS. 1 to 13. For the constructional details and the operation of the assisted thrust system applied to the drive wheels 9 and 10, see therefore the description of the assisted thrust system relating to the version of the invention illustrated in FIGS. 1 to 13.

In FIGS. 16 to 20, a control system is illustrated that enables an operator to start up and stop the assisted thrust system according to the invention, choosing also the rotation direction of the first electric motor 13 and the second electric motor 14, or of the third electric motor 48.

The control system comprises a handle 51 fixed to the frame 55 of the carriage 1 at a front wall 52 of the carriage 1 on which a control panel 50 can be installed, for example in the case of a carriage for distributing hot meals or refrigerated foods.

The handle 51 comprises a grip 56 to the ends of which a first plate 57 and a second plate 58 are fixed that are arranged perpendicular to the grip 56.

The first plate 57 is provided with a first seat 67 that can be coupled with a first support element 53 fixed to the frame 55 and the second plate 58 is provided with a second seat 68 that can be coupled with a second support element 54 fixed to the frame 55. The first support element 53 and the second support element 54 are used to fix the handle 51 to the frame 55 of the carriage 1. Fixing is achieved by a first pin 59 that is inserted into a hole 66 of the first plate 57 and into a corresponding hole 60 of the first support element, and by a second pin 61 that is inserted into corresponding holes (that are not visible in the figures) of the second plate 58 and of the second support element 54.

On the first support element 53 a first switch 62, for example a microswitch and to a second switch 63, for example a microswitch, which are normally open are fixed, which are used to command, respectively, the start-up of the first electric motors 13 and the second electric motor 14, or of the third electric motor 48, in a first rotation direction and in a second rotation direction opposite the first rotation direction.

In the first seat 67 a first tilted plane 69 designed to interact with the first microswitch 62 and a second tilted plane 70 designed to interact with the second microswitch 63 are provided. Similar tilted planes (that are not visible in the Figures) are provided in the second seat 68.

To the first support element 53 a first spring 62 and a second spring 63 are further fitted, whereas a third spring and a fourth spring (that are not visible in Figures) are fitted to the second support element 54. Said springs are maintained compressed by the tilted planes provided in the first seat 67 and in the second seat 68, so as to return the handle 56 to a neutral position, visible in FIG. 16, if the operator stops exerting a force on the handle 51, as will be explained below.

When an operator has to handle the carriage 1, the operator starts the third electric motor 48 or the first electric motor 13 and the second electric motor 14 by acting on the handle 51. If the operator exerts on the handle 51 a thrust to the wall 52 of the carriage, in the direction of the arrow F4 in FIG. 20, starting from the neutral position, shown in FIG. 16, the handle 51 rotates around the pins 59 and 61 in a first rotation direction F2, so that the second tilted plane 70 presses on the second switch 63, taking the second switch 63 to the closed position so as to start up the first electric motor 13 and the second electric motor 14, or the third electric motor 48, with a rotation direction that is consistent, for example, with a forward movement of the carriage 1. If on the other hand the operator exerts on the handle 51 a traction away from the wall 52 of the carriage, in the direction of the arrow F3 in FIG. 20, the handle 51 rotates around the pins 59 and 61 in a second rotation direction F1 opposite the first rotation direction F2, so that the first tilted plane 69 presses on the first switch 62 by taking the first switch 62 to the closed position to start up the first electric motor 13 and the second electric motor 14, or the third electric motor 48, with a rotation direction that is consistent with backward movement of the carriage 1. The first electric motor 13 and the second electric motor 14, or the third electric motor 48, remain in operation as along as the operator continues to exert a thrust or traction on the handle 51.

Figures 16, 17, 18:
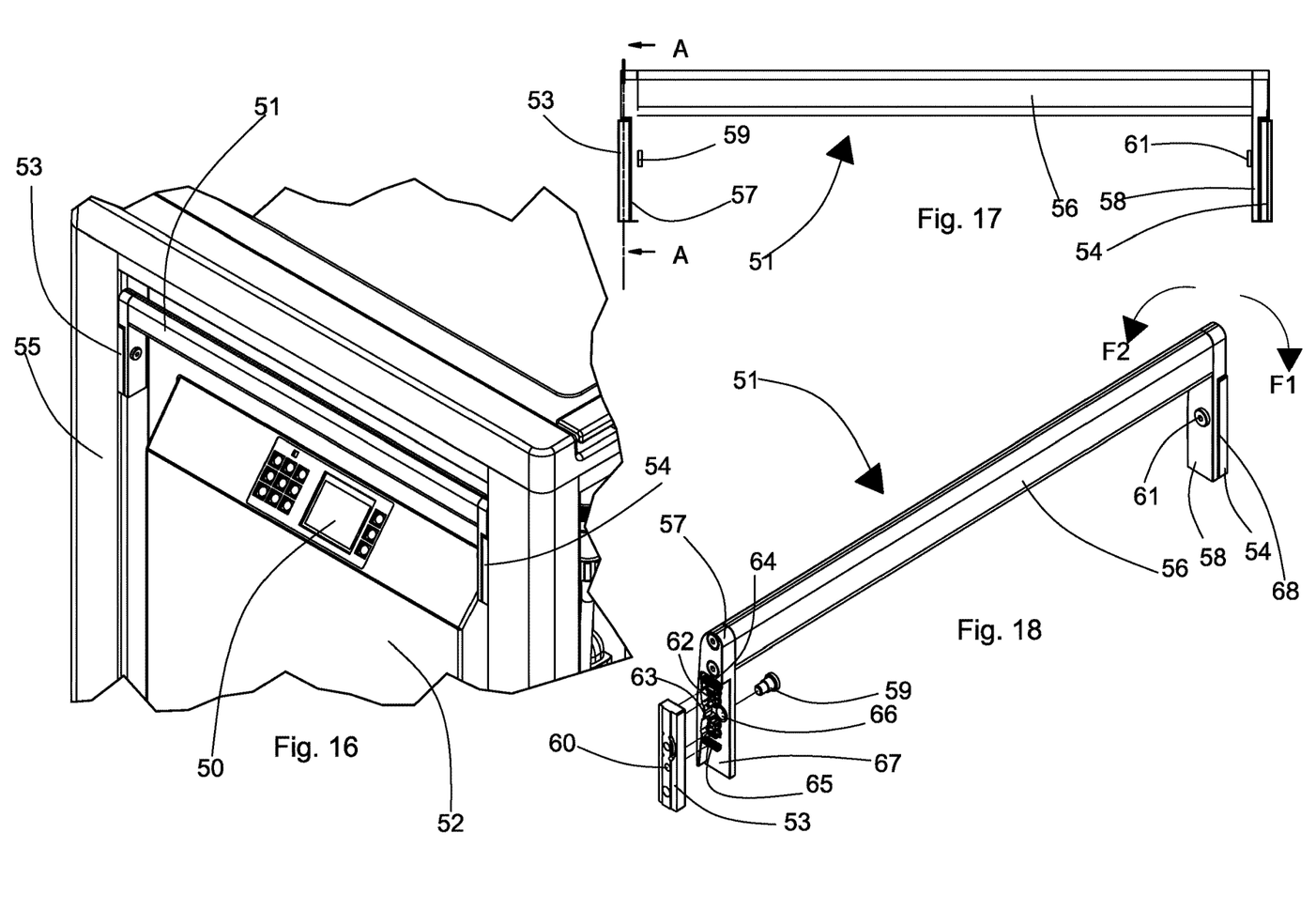
FIGS. 16 to 20 illustrate a command system that enables an operator to start up and stop the assisted thrust system according to the invention.
Figure 19:
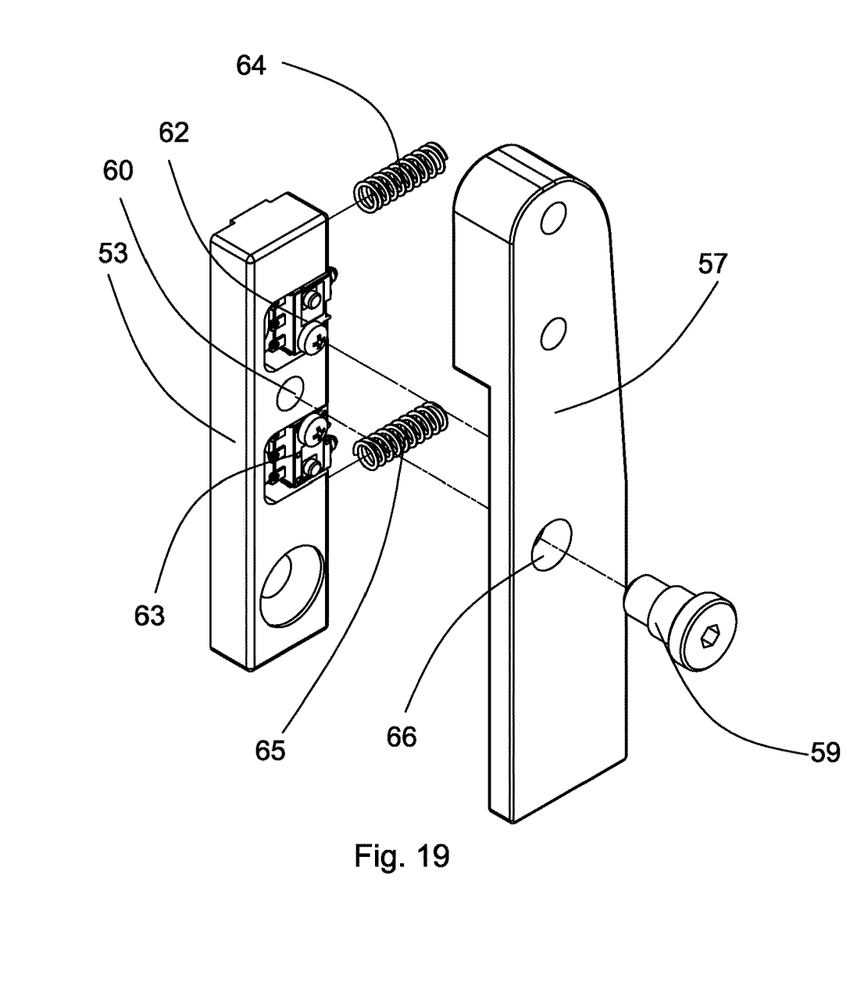
Figure 20:
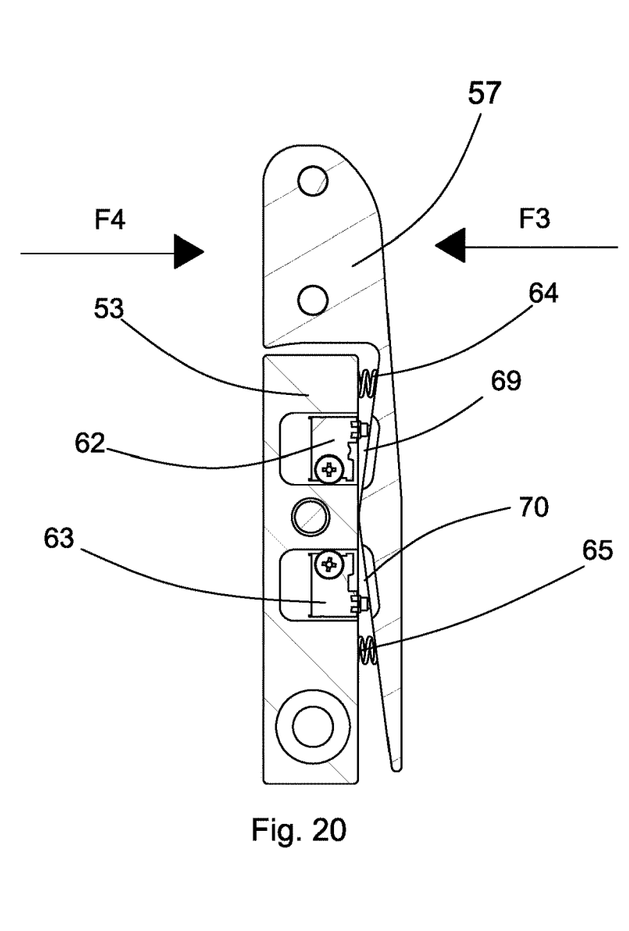

If the operator stops exerting a thrust or traction on the handle 51, the first spring 64, the second spring 65, the third spring and the fourth spring, as explained previously, return the handle 51 to the neutral position, in which the handle 51 does not interact with the microswitches 62, 63, which thus return to the open position, causing the first electric motor 13 and the second electric motor 14, or the third electric motor 48, to stop. This has the significant advantage that the risk is eliminated completely that the carriage may move autonomously without control by the operator, thus ensuring maximum security in use of the assisted thrust system according to the invention.

Alternatively, starting and stopping the first electric motor 13 and the second electric motor 14, or the third electric motor 48, and the choice of the rotation direction thereof can be performed by control buttons arranged in positions that are ergonomically suitable for an operator, depending on the shape and structure of the carriage 1, to enable the operator to conveniently access said control buttons.

It should be noted that in FIG. 18 the microswitches 62 and 63, the first spring 64 and the second spring 65 are shown inside the first seat 67, i.e. in the position in which they are located when the handle 51 is fitted to the support elements 53, 54.

Owing to the magnetic coupling between the aluminium discs 22, 23; 32, 33 and the permanent magnets 25, 26; 35, 36, torque is generated on the drive wheels 9, 10, which facilitates the operator in pushing the carriage.

In order to brake the carriage, it is sufficient for the operator to reverse the rotation direction of the first and second electric motors 13, 14, or of the third electric motor 48.

It should be noted that the third electric motor 48, or the first and second electric motors 13, 14, are dimensioned in such a manner as to provide a drive torque that is not sufficient to move the carriage independently, but useful for helping the operator in pushing. Also, this feature makes handling of the carriage simpler and safer because it contributes to eliminate the risk that the carriage can move autonomously without the thrust of the operator. Advantageously, motion to the drive wheels is transmitted by magnetic coupling, thus without the use of any mechanical element that is subject to wear.

Further, when the assisted thrust system is switched off, the drive wheels can rotate freely without any friction generated by the system. This has the significant advantage that if the energy source that supplies the assisted thrust system becomes exhausted, the carriage can be anyway moved easily without resorting to mechanical releases the presence of which is necessary in systems like those disclosed in the aforementioned prior art documents.

Further, the system according to the invention does not require a differential u that is normally used in motorized systems and is necessary to modify the rotation speed of the drive wheels on a curve. In the assisted thrust system according to the invention, the speed between one drive wheel and the other varies automatically owing to the magnetic coupling between the third electric motor 48, or the first and second electric motors 13, 14, and the drive wheels 9, 10 of the carriage.

The present invention has been disclosed with reference to a food carriage, but it must be understood that the assisted thrust system according to the invention can be used on any type of carriage for moving loads.

The invention claimed is:

1. An assisted thrust system for a carriage provided with wheels, wherein the carriage comprises a base to which a first directional wheel and a second directional wheel are fixed that are connected to the base by respective support elements that can rotate in relation to the base around a respective axis that is perpendicular to the base, wherein a first drive wheel and a second drive wheel are further fixed to the base and rotated by at least one gearmotor unit, wherein said at least one gearmotor unit drives said first drive wheel by a first magnetic coupling device and said second drive wheel by a second magnetic coupling device, wherein said at least one gearmotor unit comprises a first gearmotor unit that drives said first drive wheel and a second gearmotor unit that drives said second drive wheel, wherein said first magnetic coupling device includes a first disc made of electrically conductive material and a second disc made of electrically conductive material that are fitted on an a first outlet shaft of the first gearmotor unit, a first group of permanent magnets and a second group of permanent magnets inserted into respective first seats with which the first drive wheel is provided, wherein said first drive wheel is arranged between said first disc and said second disc on said first outlet shaft free to rotate in relation thereto, wherein said first disc is inserted with clearance into a first seat obtained in said first drive wheel and faces said first group of permanent magnets, wherein said second disc is inserted with clearance into a second seat obtained in said first drive wheel in a position opposite said first seat and faces said second group of permanent magnets, and wherein said second magnetic coupling device includes a third disc made of electrically conductive material and a fourth disc made of electrically conductive material that are fitted on second outlet shaft of the second gearmotor unit, a third group of permanent magnets and a fourth group of permanent magnets inserted into respective second seats with which the second drive wheel is provided, wherein said second drive wheel is arranged between said third disc and said fourth disc on said second outlet shaft and is free to rotate in relation thereto, in which said third disc is inserted with clearance into a third seat obtained in said second drive wheel and faces said third group of permanent magnets, wherein said fourth disc is inserted with clearance into a fourth seat obtained in said second drive wheel in a position opposite said third seat and faces said fourth group of permanent magnets.

2. The assisted thrust system according to claim 1, wherein said electrically conductive material is aluminium.

3. The assisted thrust system according to claim 1, wherein said at least one gearmotor unit comprises an electric motor powered by a battery arranged on said carriage.

4. The assisted thrust system according to claim 1, wherein said at least one gearmotor unit is sized so as to develop a drive torque on said first drive wheel and second drive wheel that is not sufficient to move the carriage without the help of the thrust of an operator.

5. The assisted thrust system according to claim 1, wherein said at least one gearmotor unit can be activated or deactivated by an operator acting on a handle fixed to a frame of the carriage, wherein said handle is fixed to a first support element and to a second support element fixed to the frame, said handle being able to rotate with respect to said first support element and to said second support element, wherein on at least one of said first support element and said second support element a first normally open switch and a second normally open switch are fixed, wherein said first switch is closed by exerting traction on said handle so as to rotate the handle in a second rotation direction, and said second switch is closed by exerting a thrust on said handle so as to rotate said handle in a first rotation direction opposite said second rotation direction, said rotating occurring from a neutral position of said handle, at which said first switch and said second switch are both in an open position.

6. The assisted thrust system according to claim 5, wherein said first switch is maintained in a closed position as long as traction is exerted on the handle, wherein said second switch is maintained in a closed position as long as a thrust is exerted on the handle.

7. The assisted thrust system according to claim 5, wherein on said first support element a first spring and a second spring are fixed, wherein on said second support element a third spring and a fourth spring are fixed, in which said first spring, said second spring, said third spring and said fourth spring interact with said handle to return said handle to said neutral position when traction or thrust stops being exerted on the handle.

8. The assisted thrust system according to claim 1, wherein activation or deactivation of said at least one gearmotor unit and a choice of the rotation direction thereof can be achieved by an operator by control buttons arranged on the carriage in ergonomically suitable positions for an operator, depending on the form and structure of the carriage.

9. An assisted thrust system for a carriage provided with wheels, wherein the carriage comprises a base to which a first directional wheel and a second directional wheel are fixed that are connected to the base by respective support elements that can rotate in relation to the base around a respective axis that is perpendicular to the base, wherein a first drive wheel and a second drive wheel are fixed to the base and rotated by at least one gearmotor unit, wherein said at least one gearmotor unit drives said first drive wheel by a first magnetic coupling device and said second drive wheel by a second magnetic coupling device, wherein said at least one gearmotor unit comprises a single gearmotor unit that drives both said first drive wheel and said second drive wheel, wherein said first drive wheel and said second drive wheel are arranged at opposite ends of an axle free to rotate in relation thereto, said axle being rotated by said single gearmotor unit, wherein said first magnetic coupling device includes a first disc made of electrically conductive material and a second disc made of electrically conductive material that are fitted on said axle, a first group of permanent magnets and a second group of permanent magnets inserted into respective seats provided in the first drive wheel, wherein said first drive wheel is arranged between said first disc and said second disc on said axle and is free to rotate in relation thereto, in which said first disc is inserted with clearance into a first seat obtained in said first drive wheel and faces said first group of permanent magnets, in which said second disc is inserted with clearance into a second seat obtained in said first drive wheel in a position opposite said first seat and faces said second group of permanent magnets, wherein said second magnetic coupling device includes a first disc made of electrically conductive material and a second disc made of electrically conductive material that are fitted on said axle, a first group of permanent magnets and a second group of permanent magnets inserted into respective seats provided in the second drive wheel, wherein said second drive wheel is arranged between said first disc and said second disc on said axle and is free to rotate in relation thereto, in which said first disc is inserted with clearance into a first seat obtained in said second drive wheel and faces said first group of permanent magnets, wherein said second disc is inserted with clearance into a second seat obtained in said second drive wheel in a position opposite said first seat and faces said second group of permanent magnets.

10. The assisted thrust system according to claim 9, wherein said electrically conductive material is aluminium.

11. The assisted thrust system according to claim 9, wherein said at least one gearmotor unit comprises an electric motor powered by a battery arranged on said carriage.

12. The assisted thrust system according to claim 9, wherein said at least one gearmotor unit is sized so as to develop a drive torque on said first drive wheel and second drive wheel that is not sufficient to move the carriage without the help of the thrust of an operator.

13. The assisted thrust system according to claim 9, wherein said at least one gearmotor unit can be activated or deactivated by an operator acting on a handle fixed to a frame of the carriage, wherein said handle is fixed to a first support element and to a second support element fixed to the frame, said handle being able to rotate with respect to said first support element and to said second support element, wherein on at least one of said first support element and said second support element a first normally open switch and a second normally open switch are fixed, wherein said first switch is closed by exerting traction on said handle so as to rotate the handle in a second rotation direction, and said second switch is closed by exerting a thrust on said handle so as to rotate said handle in a first rotation direction opposite said second rotation direction, said rotating occurring from a neutral position of said handle, at which said first switch and said second switch are both in an open position.

14. The assisted thrust system according to claim 13, wherein said first switch is maintained in a closed position as long as traction is exerted on the handle, wherein said second switch is maintained in a closed position as long as a thrust is exerted on the handle.

15. The assisted thrust system according to claim 13, wherein on said first support element a first spring and a second spring are fixed, wherein on said second support element a third spring and a fourth spring are fixed, in which said first spring, said second spring, said third spring and said fourth spring interact with said handle to return said handle to said neutral position when traction or thrust stops being exerted on the handle.

16. The assisted thrust system according to claim 9, wherein activation or deactivation of said at least one gearmotor unit and a choice of the rotation direction thereof can be achieved by an operator by control buttons arranged on the carriage in ergonomically suitable positions for an operator, depending on the form and structure of the carriage.

* * * * *